Patented Mar. 3, 1953

2,630,444

UNITED STATES PATENT OFFICE 2,630,444

METHOD OF MAKING SILVER FORMATE

James Paul Fugassi and George A. Cowan, Pittsburgh, Pa., assignors to The General Tire and Rubber Company, Akron, Ohio, a corporation of Ohio No Drawing. Application April 2, 1948, Serial No. 18,715

6 Claims. (Cl. 260—430)

1

The present invention relates to silver formate and to a method of preparing it. It also relates to products such as mirrors, photographic films, catalysts, and to the process of preparing these and other materials wherein silver formate is used or acted upon to simplify the preparation or to produce a superior product.

A number of methods have been proposed to prepare mirrors having a bright silver surface in adherent contact with glass or a solid transparent composition. All of these processes are relatively wasteful of the expensive silver salts; they are very difficult to apply and involve chemical processes that are very difficult to control to obtain uniformity and complete deposition of the silver salt.

It is an object of the present invention to provide a material and method for making a material that may be used with relatively good efficiency for the deposition of silver films or particles on solid objects.

It is another object to provide a method for preparing mirrors and films of silver on solid objects, wherein a coating or solution may be simply brushed or sprayed on the surface of an article and the coated article suitably treated to produce an adherent film.

Many chemical reactions are catalyzed by active, finely divided silver which is carried by a suitable carrier, such as alumina, silica or the like. The deposition of finely divided silver on a carrier has heretofore involved relatively difficult processing operations, and it has not been possible to treat a carrier with a solution of a silver salt and simply heat the thus treated carrier.

It is therefore another object of the present invention to provide an improved silver catalyst and an improved more economical method of preparing such a catalyst.

The usual photographic films employing silver salts are not suitable for the taking of pictures in an infrared light, although they are relatively readily and inexpensively prepared. It is therefore another object of the present invention to provide a photographic film and method of preparing the same which is sensitive to infrared light.

Chemical literature indicates that silver formate does not exist and that aqueous solutions of silver ions and formate ions when mixed together yield only metallic silver. We have found, in contrast to the teaching in the literature, that silver formate may be prepared and isolated as a relatively pure compound. We have also found

2 new and simplified processes for the making of mirrors, silver catalysts, and the preparation of some compounds involving the utilization of silver formate.

Silver formate is prepared in accordance with our invention by reacting silver ions with about an equal number of mols of formate ions at low temperature and, preferably, in an aqueous medium. The reacted mixture is maintained at low temperature until the silver formate is precipitated from the aqueous medium. The reaction and separation should occur in the substantial absence of any acid that is more acidic than acids whose acidic strength is comparable in magnitude to that of formic acid under the conditions of the reaction. Preferably, the reaction and separation should occur in the substantial absence of any acid more acidic than formic and/or nitrous acids, which acids have acidic strength of comparable magnitude.

The formate ions are preferably furnished by formic acid although soluble formates, such as alkali metal formates including sodium, potassium and ammonium formates may be used. The silver ions may be obtained from a silver compound such as silver oxide, silver carbonate, silver acetate, silver nitrite or a silver salt of any acid having an acidic strength of comparable magnitude to formic acid under reaction conditions. Silver salts more soluble in water than silver formate under reaction conditions may be used. Preferably, the silver salt should be a salt of an acid whose acidic strength is less than formic acid at the temperature of the reaction and the temperatures at which the silver formate is maintained in solution in aqueous liquid.

The temperature at which the formate ions and silver ions are reacted should be below 5° C., and temperatures of 0° C. to −10° or −15° C. are preferable. Silver formate is precipitated from the aqueous mixture of formate ions and silver ions which is maintained at low temperature in a suitable cooling bath. The addition of or the presence of a water-miscible organic material, preferably a liquid such as alcohol, acetone and the like, in sufficient amount serves to prevent freezing of the mixture, and such addition is desirable when the temperature of the aqueous mixture is below 0° C. Silver formate is only slightly soluble in such aqueous mixture containing a water-miscible or water-soluble organic material, such as a solid or liquid having hydroxyl or carbonyl groups, and precipitates from the liquid. It can be substantially completely precipitated by excess of the water-soluble organic material. The precipitate is separated from the supernatant liquid, washed with organic solvent, dried and stored in the absence of light and preferably at relatively low temperature. The purity of the silver formate is improved if in addition to low temperature light is excluded during its entire preparation, drying and storage. When the number of mols of formate ions is not approximately equal to the number of mols of silver ions, metallic silver is usually produced during the reaction to contaminate the silver formate.

The following examples, in which parts are by weight, illustrate the present invention.

*Example 1*

10 volumes of 5-normal silver nitrate solution are reacted with 10 volumes of a 5-normal sodium carbonate or sodium bicarbonate solution. The silver carbonate separates as a yellow precipitate and is thoroughly washed by decantation, using distilled water. The silver carbonate thus prepared by use of sodium carbonate contains small amounts of silver oxide, whereas the product prepared using the sodium bicarbonate solution is substantially free from the silver oxide.

About 168 parts by weight of the silver carbonate thus prepared (dry basis) are mixed with 20 or 30 parts of distilled water to form a slurry, which is then cooled to 0° C., or lower, if water-soluble organic compounds have been added, by the addition of ice cubes made from distilled water. After the slurry is cooled, the supernatant liquid is decanted off as completely as possible, the ice cubes being allowed to remain. To the chilled slurry of silver carbonate thus prepared, 46 parts of formic acid (the equivalent of silver carbonate) are added with vigorous mechanical stirring to avoid excess formic acid being present at any instant in any portion of the solution. Carbon dioxide is evolved rapidly upon stirring of the acid and its rapid evolution aids in the stirring of the mixture. Immediately following the addition of the formic acid, the ice cubes are removed and excess acetone is added to the mixture to precipitate silver formate completely. The precipitate settles rapidly and after removal of the supernatant liquid the precipitate is washed repeatedly with acetone by decantation procedure. After a number of washings, the precipitation is pressed between porous plates so that excess solvent is pressed out. The precipitate thus prepared is transferred to a vacuum desiccator, which is shielded from light, where it is dried under vacuum and hence simultaneously cooled by the evaporation of water and acetone.

The silver formate obtained is a light tan solid which darkens in the presence of light. It decomposes slowly at room temperature, leaving a gray residue of finely divided silver. The decomposition rate of the solid is higher in the presence of light, and the decomposition curve indicates the decomposition to be autocatalytic; hence it appears that the decomposition is accelerated by the presence of free metallic silver.

*Example 2*

The portion of the freshly prepared silver formate is placed in a cavity in a brass block and the block is heated. The silver formate explodes when the temperature of the block reaches about 95° C.

*Example 3*

An aqueous acetone solution containing about 1% of silver formate prepared as above is sprayed on a glass surface, which is heated with an infrared light to 100° C. An adherent silver film is quickly deposited on the surface of the glass, rendering it suitable for use as a mirror.

When in Example 1 the slurry of silver carbonate also contained sufficient acetone or alcohol to lower the temperature to —15° C., other conditions remaining the same, the silver formate was lighter in color and mirrors prepared from the aqueous acetone solution were somewhat brighter. Also, the stability of the silver formate was somewhat greater, indicating that the amount of metallic silver present had been reduced.

We have found that silver formate is exceptionally desirable in the production of silver catalysts, similar to that described in the Cambron et al. United States Patent No. 2,426,761. A suitable carrier, such as alumina, silica, calcium carbonate or other solid, may be contacted with a cold solution of silver formate, drained and dried at a suitable elevated temperature, or even allowed to stand in the presence of light or infrared radiation. The silver is deposited on the carrier. An aqueous solution of silver formate on standing gives a colloidal silver solution which eventually precipitates metallic silver.

The silver formate is also desirable for the production of formate esters, such as tertiary butyl formate and other formate esters, many of which have been difficult to prepare by other methods. This preparation should for best results take in nonaqueous liquids, preferably a hydrocarbon, such for example as hexane, maintained at low temperatures. The reaction is illustrated by the following equation:

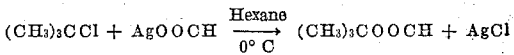

$$(CH_3)_3CCl + AgOOCH \xrightarrow[0°\,C]{Hexane} (CH_3)_3COOCH + AgCl$$

The powdered silver formate is added slowly to the tertiary butyl chloride in hexane. The precipitate may be removed by filtration and the diluent by distillation.

Silver formate may be ground into a film-forming fluid such as a gelatin solution or into a solution of any film-forming, transparent resin such as a solution of polyvinyl-acetate, -chloride, -butyral, polymethylacrylate, polyacrylonitrile, etc., or even a solution of nitrocellulose. The resultant solution may be used as a casting on a transparent base or may be cast or extruded to form films by evaporation of solvent. When the fluid contains polymerizable constituents the film may be hardened or solidified by polymerization. The entire process is carried on in the absence of light, and preferably below 5° C. These films are generally light-sensitive and may be suitable for photographic purposes.

In these emulsions, the silver formate may be employed alone or in conjunction with silver halide, in which case a small amount of silver formate appears to activate the silver halide emulsion so that exceedingly fast films may be produced. In addition, films prepared with silver formate in the emulsion may have infrared sensitivity.

It is also apparent that in accordance with the provisions of the patent statutes, modifications of the invention may be made without changing the spirit thereof.

What we claim is:

1. A method of making silver formate which comprises reacting in an aqueous liquid at a temperature not appreciably in excess of 5° C. formate ions from formic acid and silver ions, said silver ions being produced from a silver salt of an acid whose acidic strength does not exceed that of acids having acidic strengths of the order of the magnitude of formic acid and nitrous acids, precipitating the silver formate thus formed by incorporating into the aqueous liquid an organic material soluble in water, and separating the precipitate from the liquid; said formate ions and said silver ions when reacted being substantially free from the presence of ions of an acid having an acidic strength of greater order of magnitude than that of formic and nitrous acids.

2. The method of making silver formate which comprises preparing a slurry of a water-insoluble silver salt of an acid whose acidic strength does not exceed that of nitrous acid, cooling said slurry to at least 5° C., and while maintaining the slurry in a cooled condition mixing therewith formate ions from formic acid, substantially completing the precipitation of the silver formate from aqueous solution by addition of an organic liquid miscible with water, separating the precipitated silver formate from the supernatant liquid, and washing and drying the solid; said slurry after mixing with said formate ions being substantially free of anions of an acid having an acidity of greater order of magnitude than formic acid.

3. The method of claim 2 wherein light is substantially excluded at all times after the silver and formate ions are reacted.

4. A method of making silver formate which comprises mixing formic acid with water and a silver compound selected from the group consisting of silver oxide, silver hydroxide, silver acetate, silver nitrite and maintaining the reaction mixture at temperatures not appreciably in excess of 5° C.

5. A method of making silver formate which comprises mixing at temperatures not appreciably in excess of 5° C. formic acid with water and a silver compound selected from the group consisting of silver oxide, silver hydroxide, silver acetate and silver nitrite and precipitating the silver formate thus formed by incorporating in the aqueous liquid an organic material soluble in water and separating the precipitate from the liquid.

6. The method of making silver formate which comprises preparing a slurry of silver carbonate in water substantially free from acids whose acidic strength is substantially greater than formic acid, cooling said slurry to temperatures not appreciably above 5° C. and while maintaining the slurry in a cooled condition mixing therewith formate ions from formic acid in such proportions that the number of mols of formate ions and the number of mols silver ions are about equal, substantially completing the precipitation of silver formate from aqueous solution by addition of an organic liquid miscible with water, separating the precipitated silver formate from the supernatant liquid, and washing and drying the solid.

JAMES PAUL FUGASSI.
GEORGE A. COWAN.

REFERENCES CITED

The following references are of record in the file of this patent:

UNITED STATES PATENTS

| Number | Name | Date |
|---|---|---|
| 1,751,964 | Winckler | Mar. 25, 1930 |
| 1,976,302 | Sheppard | Oct. 9, 1934 |
| 2,040,782 | Van Peski | May 12, 1936 |
| 2,066,582 | Sheppard et al. | Jan. 5, 1937 |
| 2,125,333 | Carter | Aug. 2, 1938 |
| 2,139,400 | Bird | Dec. 6, 1938 |
| 2,374,754 | Kreidl et al. | May 1, 1945 |
| 2,424,083 | Finch et al. | July 15, 1947 |

OTHER REFERENCES

Maumene, "Bull. Soc. Chim. Paris," 3rd series, vol. 9 (1893), pp. 580–84.

Brun et al., "Gass. Chim. Ital.," vol. 46, pt. II (1916), page 35.

Kendall et al., "Jour. Am. Chem. Soc.," vol. 43 (1921), page 1477.

Lange's Handbook of Chemistry (6th ed., 1946), pp. 1377–81.